US011422857B2

(12) United States Patent
Dalmia et al.

(10) Patent No.: US 11,422,857 B2
(45) Date of Patent: Aug. 23, 2022

(54) MULTI-LEVEL SCHEDULING

(71) Applicant: Apple Inc., Cupertino, CA (US)

(72) Inventors: Kushal Dalmia, Santa Clara, CA (US); Jeremy C. Andrus, Sunnyvale, CA (US); Daniel A. Chimene, San Francisco, CA (US); Nigel R. Gamble, Mountain View, CA (US); James M. Magee, Orlando, FL (US); Daniel A. Steffen, San Francisco, CA (US)

(73) Assignee: Apple Inc., Cupertino, CA (US)

( * ) Notice: Subject to any disclaimer, the term of this patent is extended or adjusted under 35 U.S.C. 154(b) by 102 days.

(21) Appl. No.: 16/882,092

(22) Filed: May 22, 2020

(65) Prior Publication Data
US 2020/0379804 A1      Dec. 3, 2020

Related U.S. Application Data

(60) Provisional application No. 62/855,966, filed on Jun. 1, 2019.

(51) Int. Cl.
*G06F 9/46* (2006.01)
*G06F 9/48* (2006.01)
*G06F 9/50* (2006.01)

(52) U.S. Cl.
CPC ............ *G06F 9/4887* (2013.01); *G06F 9/485* (2013.01); *G06F 9/5038* (2013.01); *G06F 2209/484* (2013.01); *G06F 2209/5018* (2013.01)

(58) Field of Classification Search
CPC ...... G06F 9/4887; G06F 9/485; G06F 9/5038; G06F 2209/484; G06F 2209/5018
See application file for complete search history.

(56) References Cited

U.S. PATENT DOCUMENTS

| 7,681,014 | B2 | 3/2010 | Jensen et al. |
| 7,685,599 | B2 | 3/2010 | Kanai et al. |
| 8,607,234 | B2 | 12/2013 | Memik et al. |
| 8,869,153 | B2 | 10/2014 | Krieger et al. |

*Primary Examiner* — Gregory A Kessler
(74) *Attorney, Agent, or Firm* — Kilpatrick Townsend & Stockton LLP

(57) ABSTRACT

Embodiments described herein provide multi-level scheduling for threads in a data processing system. One embodiment provides a data processing system comprising one or more processors, a computer-readable memory coupled to the one or more processors, the computer-readable memory to store instructions which, when executed by the one or more processors, configure the one or more processors to receive execution threads for execution on the one or more processors, map the execution threads into a first plurality of buckets based at least in part on a quality of service class of the execution threads, schedule the first plurality of buckets for execution using a first scheduling algorithm, schedule a second plurality thread groups within the first plurality of buckets for execution using a second scheduling algorithm, and schedule a third plurality of threads within the second plurality of thread groups using a third scheduling algorithm.

21 Claims, 12 Drawing Sheets

MULTI-LEVEL SCHEDULING

CROSS-REFERENCE

This application claims priority to U.S. Provisional Application Ser. No. 62/855,966 filed on Jun. 1, 2019, which is hereby incorporated herein by reference.

TECHNICAL FIELD

This disclosure relates generally to data processing systems. More specifically, this disclosure relates to a system and associated methods for multi-level scheduling of tasks for data processing systems.

BACKGROUND

Applications executing on a data processing system can perform operations by requesting the system to perform specific tasks. It is possible for a single operation to result in several task requests. To handle the multiple task requests, the tasks can be placed in one or more queues and various processes and utilities of the data processing system handle the queued operations. The performance of the several task requests may create resource contentions between the several tasks or between system related tasks performed by the operating system.

Typically, this process is managed by the operating system kernel of the data processing system. Operating system kernels may be designed to run on a variety of platforms to deliver a wide range of requirements from providing quick access to central processing unit (CPU) resources for latency sensitive workloads (e.g., UI interactions, multimedia recording/playback) to starvation avoidance for lower priority batch workloads (e.g., photos sync, source compilation).

Operating system kernels may include schedulers which attempt to achieve these goals by using priority indicator tags that are applied to threads in the system. The scheduler can then treat high priority threads as interactive threads and low priority threads as batch threads. One of the roles of the operating system kernel scheduler is to share the CPU resources among these threads in an efficient manner. The scheduler may use a timesharing model based on priority decay to share the CPU fairly as the system load increases. However, this thread-level approach may blur the relationship between threads and higher-level user workloads, making it difficult for the scheduler to manage workloads effectively.

SUMMARY

Embodiments described herein provide techniques to implement multi-level scheduling in data processing systems. In some embodiments, techniques described herein enable a scheduler to schedule tasks for execution at a system-wide level, a thread group level, and a thread level.

One embodiment provides a data processing system, comprising one or more processors, a computer-readable memory coupled to the one or more processors, the computer-readable memory to store instructions which, when executed by the one or more processors, configure the one or more processors to receive execution threads for execution on the one or more processors, map the execution threads into a first plurality of buckets based at least in part on a quality of service class of the execution threads, schedule the first plurality of buckets for execution using a first scheduling algorithm, schedule a second plurality thread groups within the first plurality of buckets for execution using a second scheduling algorithm, and schedule a third plurality of threads within the second plurality of thread groups using a third scheduling algorithm.

One embodiment provides for a non-transitory machine-readable medium storing instructions which, when executed by one or more processors of an electronic device, cause the one or more processors to perform operations comprising receiving execution threads for execution on the one or more processors, mapping the execution threads into a first plurality of buckets based at least in part on a quality of service class of the execution threads, scheduling the first plurality of buckets for execution using a first scheduling algorithm, scheduling a second plurality thread groups within the first plurality of buckets for execution using a second scheduling algorithm, and scheduling a third plurality of threads within the second plurality of thread groups using a third scheduling algorithm.

One embodiment provides for a computer-implemented method, comprising receiving execution threads for execution on the one or more processors, mapping the execution threads into a first plurality of buckets based at least in part on a quality of service class of the execution threads, scheduling the first plurality of buckets for execution using a first scheduling algorithm, scheduling a second plurality thread groups within the first plurality of buckets for execution using a second scheduling algorithm, and scheduling a third plurality of threads within the second plurality of thread groups using a third scheduling algorithm.

Other features of the present embodiments will be apparent from the accompanying drawings and from the detailed description, which follows.

BRIEF DESCRIPTION OF THE DRAWINGS

Embodiments of the disclosure are illustrated by way of example, and not by way of limitation, in the figures of the accompanying drawings in which like reference numerals refer to similar elements, and in which.

DETAILED DESCRIPTION

Figure 1:
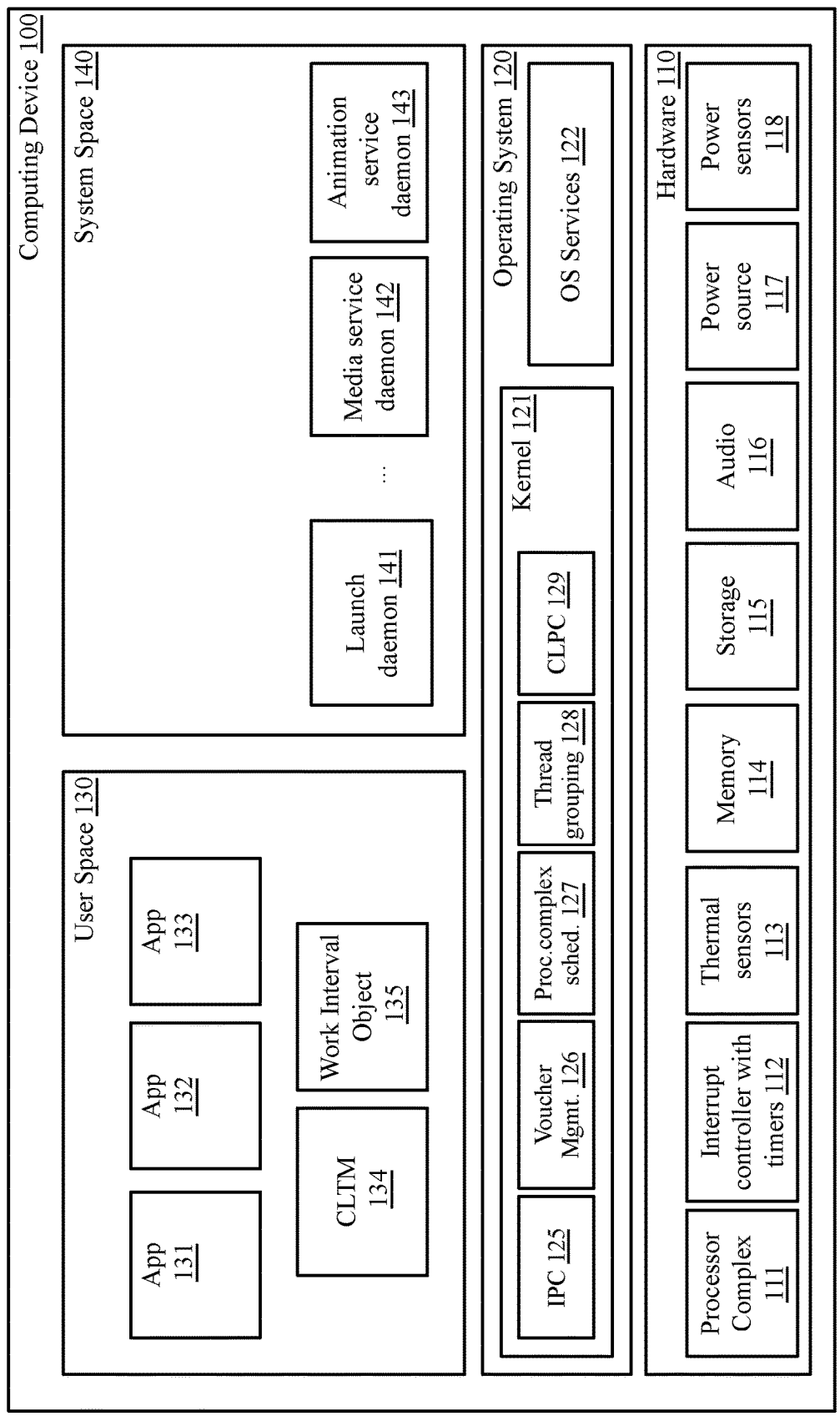
FIG. 1 illustrates an overview of a computing device 100 for processing threads having thread groups, according to some embodiments.

Various embodiments and aspects will be described with reference to details discussed below, and the accompanying drawings will illustrate the various embodiments. The following description and drawings are illustrative and are not to be construed as limiting. Numerous specific details are described to provide a thorough understanding of various embodiments. However, in certain instances, well-known or conventional details are not described in order to provide a concise discussion of embodiments.

Reference in the specification to "one embodiment" or "an embodiment" or "some embodiments" means that a particular feature, structure, or characteristic described in conjunction with the embodiment can be included in at least one embodiment. The appearances of the phrase "embodiment" in various places in the specification do not necessarily all refer to the same embodiment.

It should be noted that there can be variations to the flow diagrams or the steps (or operations) described therein without departing from the embodiments described herein. For instance, the steps can be performed in parallel, simultaneously, a differing order, or steps can be added, deleted, or modified.

Reference will now be made in detail to embodiments, examples of which are illustrated in the accompanying drawings. In the following detailed description, numerous specific details are set forth in order to provide a thorough understanding of the present invention. However, it will be apparent to one of ordinary skill in the art that the present invention may be practiced without these specific details. In other instances, well-known methods, procedures, components, circuits, and networks have not been described in detail so as not to unnecessarily obscure aspects of the embodiments.

It will also be understood that, although the terms first, second, etc. may be used herein to describe various elements, these elements should not be limited by these terms. These terms are only used to distinguish one element from another. For example, a first contact could be termed a second contact, and, similarly, a second contact could be termed a first contact, without departing from the scope of the present invention. The first contact and the second contact are both contacts, but they are not the same contact.

The terminology used in the description of the invention herein is for the purpose of describing particular embodiments only and is not intended to be limiting of the invention. As used in the description of the invention and the appended claims, the singular forms "a", "an" and "the" are intended to include the plural forms as well, unless the context clearly indicates otherwise. It will also be understood that the term "and/or" as used herein refers to and encompasses any and all possible combinations of one or more of the associated listed items. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

As used herein, the term "if" may be construed to mean "when" or "upon" or "in response to determining" or "in response to detecting," depending on the context. Similarly, the phrase "if it is determined" or "if [a stated condition or event] is detected" may be construed to mean "upon determining" or "in response to determining" or "upon detecting [the stated condition or event]" or "in response to detecting [the stated condition or event]," depending on the context.

Embodiments of data processing systems, user interfaces for such devices, and associated processes for using such devices are described. In some embodiments, the data processing system may comprise a portable communication device such as a mobile telephone that also contains other functions, such as PDA and/or music player functions. Exemplary embodiments of portable multifunction devices include, without limitation, the iPhone®, iPad®, and iPod Touch® devices from Apple Computer, Inc. of Cupertino, Calif.

As described above, operating system kernels may include schedulers which expect execution threads to be tagged with a priority indicator, to treat high priority threads as interactive threads and low priority threads as batch threads. The scheduler can apply a thread-based timesharing model based on priority decay to share the CPU fairly as the system load increases. One artifact of this thread-based timesharing approach is that threads at the same priority level may be treated similarly irrespective of which user workload they are servicing. This may result in sub-optimal scheduling decisions and in priority inflation across the platform when individual subsystems raise their priority to avoid starvation and timesharing with other unrelated threads.

Traditional thread level scheduling model may also suffer from inaccurate accounting and poor isolation. For example, CPU accounting at the thread level incentivizes creating more threads on the system. Also, in work queues, which are dynamic thread pools where threads are created and destroyed rapidly, thread level accounting is inaccurate and allows excessive CPU usage. For example, schedulers may not be aware of workloads that involve multiple threads. Further, in some schedulers, timesharing is achieved by decaying the priority of threads depending on global system load. This property may lead to a burst of activity at the same or lower priority band causing decay for the App/UI thread, which in turn may lead to poor performance and responsiveness. Embodiments described herein address these and other issues by providing techniques to implement multi-level scheduling in data processing systems.

Computing Systems and Devices

FIG. 1 illustrates an overview of a computing device 100 for processing threads having thread groups, according to some embodiments. The computing device 100 can include hardware 110, operating system 120, user space 130, and system space 140 as described more fully below.

Hardware 110 can include a processor complex 111 with a plurality of core types or multiple processors of differing types. Processor complex 111 can comprise a multiprocessing system having a plurality of clusters of cores, each cluster having one or more cores of a core type, interconnected with one or more buses. Processor complex 111 can comprise a symmetric multiprocessing system (SMP) having a plurality of clusters of a same type of core wherein at least one cluster of cores is configured differently from at least one other cluster of cores. Cluster configurations can include, e.g., different configurations of DVFS states, different cache hierarchies, or differing amounts or speeds of cache. Processor complex 111 can additionally comprise an asymmetric multiprocessing system (AMP) having a plurality of clusters of cores wherein at least one cluster of cores has a different core type than at least one other cluster of cores. Each cluster can have one or more cores. Core types can include performance cores, efficiency cores, graphics cores, digital signal processing cores, and arithmetic processing cores. A performance core can have an architecture that is designed for very high throughput and may include specialized processing such as pipelined architecture, floating point arithmetic functionality, graphics processing, or digital signal processing. A performance core may consume more energy per instruction than an efficiency core. An efficient core may consume less energy per instruction than a performance core. In an embodiment, processor complex 111 can comprise a system on a chip (SoC) that may include one or more of the hardware elements in hardware 110.

Hardware 110 can further include an interrupt controller 112 having interrupt timers for each core type of processor complex 111. Interrupt controller 112 can be used, with interrupt timers, to implement deferred inter-processor interrupts (DIPI).

Hardware 110 can also include one or more thermal sensors 113. In an embodiment, wherein processor complex 111 comprises an SoC, one more thermal sensors 113 can be included in the SoC 111. In an embodiment, at least one thermal sensor 113 can be included on the SoC 111 for each core type of the processor complex 111. In an embodiment, a thermal sensor 113 can comprise a virtual thermal sensor 113. A virtual thermal sensor 113 can comprise a plurality of physical thermal sensors 113 and logic that estimates one or more temperature values at location(s) other than the location of the physical thermal sensors 113.

Hardware 110 can additionally include memory 114, storage 115, audio processing 116, one or more power sources 117, and one or more energy and/or power consumption sensors 118. Memory 114 can be any type of memory including dynamic random-access memory (DRAM), static RAM, read-only memory (ROM), flash memory, or other memory device. Storage can include hard drive(s), solid state disk(s), flash memory, USB drive(s), network attached storage, cloud storage, or other storage medium. Audio 116 can include an audio processor that may include a digital signal processor, memory, one or more analog to digital converters (ADCs), digital to analog converters (DACs), digital sampling hardware and software, one or more coder-decoder (codec) modules, and other components. Hardware can also include video processing hardware and software (not shown), such as one or more video encoders, camera, display, and the like. Power source 117 can include one or more storage cells or batteries, an AC/DC power converter, or other power supply. Power source 117 may include one or more energy or power consumption sensors 118. Power consumption sensors 118 may also be included in specific locations, such as power consumed by the processor complex 111, power consumed by a particular subsystem, such as a display, storage device, network interfaces, and/or radio and cellular transceivers. Computing device 100 can include the above components, and/or components as described with reference to other computing systems and devices described herein.

Operating system 120 can include a kernel 121 and other operating system services 122. Kernel 121 can include a processor complex scheduler 127 for the processor complex 111. Processor complex scheduler 127 can include interfaces to processor complex 111 and interrupt controller 112. Kernel 121, or processor complex scheduler 127, can include thread group logic 128 that enables a closed loop performance controller (CLPC) to measure, track, and control performance of threads by thread groups. CLPC 129 can include logic to receive sample metrics from processor complex scheduler 127, process the sample metrics per thread group, and determined a control effort needed to meet performance targets for the threads in the thread group. CLPC 129 can recommend a core type and dynamic voltage and frequency scaling (DVFS) state for processing threads of the thread group. Inter-process communication (IPC) module 125 can facilitate communication between kernel 121, processes in user space 130, and processes in system space 140.

In an embodiment, the IPC module 125 can receive a message from a thread that references a voucher. A voucher is a collection of attributes in a message sent via inter-process communication (IPC) from a first thread, T1, to a second thread, T2. One of the attributes that thread T1 can put in the voucher is the thread group to which T1 currently belongs. The IPC module 125 can pass the voucher from a first thread to a second thread. The voucher can include a reference to a thread group that the second thread is to adopt before performing work on behalf of the first thread. Voucher management module 126 can manage vouchers within operating system 120, user space 130, and system space 140. Operating system (OS) services 122 can include input/output (I/O) service for such devices as memory 114, storage 115, network interface(s) (not shown), and a display (not shown) or other I/O device. OS services 122 can further audio and video processing interfaces, data/time service, and other OS services.

User space 130 can include one or more application programs 131-133, closed loop thermal management (CLTM) 134, and one or more work interval object(s) 135. CLTM 134 can monitor a plurality of power consumption and temperature metrics and feed samples of the metrics into a plurality of tunable controllers. The output of the CLTM 134 can determine a processor complex average power target used as input to a control effort limiter (CEL) to determine a limit on a control effort that is output by CLPC 129. The control effort limit can be used to limit the type of cores, number of cores of each type, and DVFS state for the cores for the processor complex 111. A work interval object 135 is used to represent periodic work where each period has a deadline. The work interval object 135 possesses a token and a specified time interval for one instance of the work. Threads that perform work of a particular type, e.g. audio compositing, and the work must be completed in a specified interval of time, e.g. a frame rate of audio, can be associated with the work interval object 135. User space 130 can include a plurality of work interval objects 135. A work interval object 135 can have its own thread group, as may be specified in source code, compiled code, or a bundle of executables for execution. Threads that perform work on behalf of the work interval object 135 can opt-in to the thread group of the work interval object 135. For threads that have opted-in and adopted the thread group of the work interval object 135, work performed by the threads, on behalf of the work interval object 135, is associated with the thread group of the work interval object 135 for purposes of CLPC 129 operation.

System space 140 can include a launch daemon 141 and other daemons, e.g. media service daemon 142 and animation daemon 143. In an embodiment, threads that are launched by a daemon that perform a particular type of work (e.g. daemons 142 and 143) can adopt the thread group of the daemon. Execution metrics of a thread that adopted the thread group of the daemon that launched the thread are attributable to the thread group of the daemon for purposes of CLPC 129 operation.

Figure 2A:
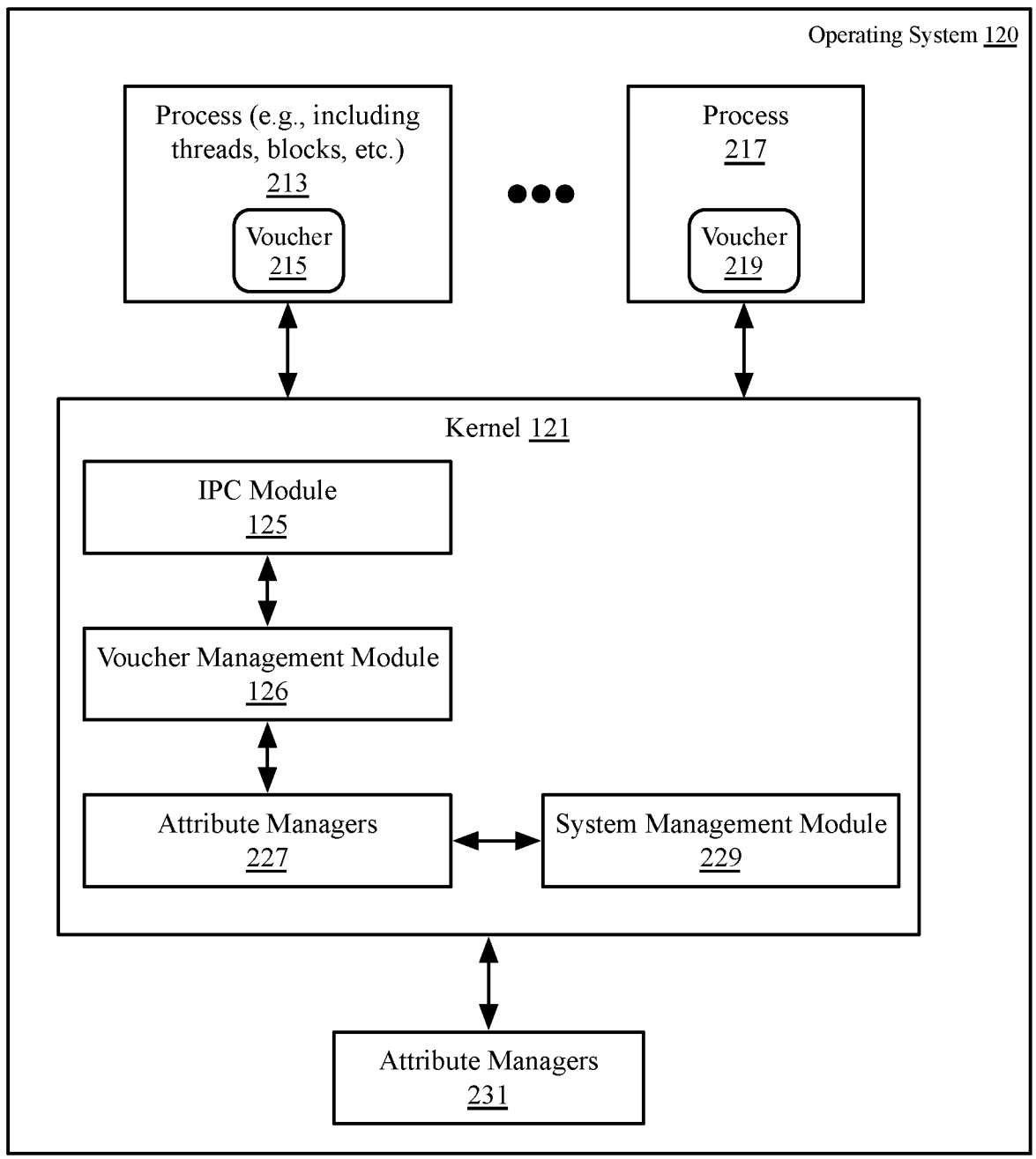
FIG. 2A is a block diagram illustrating one embodiment of a system including a voucher mechanism to pass task attributes among different processes.

FIG. 2A is a block diagram illustrating one embodiment of a system 200 including a voucher mechanism to pass task attributes among different processes. In one embodiment, operating system 120, can host execution of processes 213, 217. Each process may include threads, blocks or other instruction sequences. Kernel 121 can include attribute managers 227. Kernel 121 can include IPC module 125 to provide interfaces or methods for the exchange of data among multiple threads in one or more processes. Inter process communication may be based on shared memory, system calls, application programming interface (API) or other applicable mechanism. For example, process 213 may communicate with process 217 by sending IPC messages via IPC module 125. Voucher management module 126 may be a subsystem in kernel 121. Voucher management module 126 may include a daemon exposed via IPC operations (e.g. IPC messages). In one embodiment, vouchers of system 200, such as vouchers 215, 219, may be maintained and managed in a single subsystem via voucher management module 126.

For example, vouchers can be created, destroyed, referenced counted, copied, validated (or invalidated), or maintained via voucher management module 126. Data structures corresponding to vouchers may be stored within voucher management module 126. In one embodiment, voucher management module 126 may destroy a voucher when no longer referenced (e.g. with zero reference count). Voucher 215, 219 may represent voucher references to corresponding actual vouchers stored via voucher management module 126.

Attributes and associated values may be managed via attribute managers which can reside inside a kernel, such as attribute managers 227 or in user space runtime, such as attribute managers 231. Attribute managers may be registered in voucher management module 126 to provide different functions via corresponding attribute values (or tags, keys) carried via vouchers. These functions may include activity tracing, importance donation, power assertion management, activity scheduling, or other application functions.

In one embodiment, an attribute manager can determine attribute values for a corresponding attribute, for example, as requested via voucher management module 126. An attribute manager can maintain runtime relationships among execution instances (e.g. processes, threads, etc.) referencing (or having) vouchers specifying the corresponding attribute values. Attribute managers may request updates on properties (e.g. security privileges, priorities, etc.) of execution instances and/or system components (e.g. power management) via system management module 229.

In one embodiment, process 213 (e.g. an application) can send a voucher request for one or more attributes to voucher management module 126 (e.g. a daemon) via IPC module 125. In response, voucher management module 126 can request corresponding attribute managers for values of requested attributes to create voucher 215. Voucher management module 126 can return voucher 215 (e.g. a reference) back to process 213, e.g. via IPC module 125.

Subsequently, process 213 can send an IPC message carrying voucher 215 to process 217, e.g. via IPC module 125. In response, process 217 may send a redeem request with received voucher 215 to voucher management module 126 to take a new identity for execution based on attributes of voucher 215. IPC module 125 can forward voucher 215 from the redeem message received to voucher management module 126. In turn, voucher management module 126 may send voucher 219 (e.g. a new voucher or another reference to voucher 215) to process 217.

In response, process 217 may send an adopt message with voucher 219 to inform voucher management module 126 on taking new identities (or properties) based on attribute values included in voucher 219. Process 217 may perform operations or data processing tasks for process 213 based on the new identities. Process 217 may return voucher 219 (e.g. when the data processing tasks for process 213 are completed) back to voucher management module 126, for example, to decrement a reference count of voucher 219 and update attribute values managed in corresponding attribute managers.

In one embodiment, a context of an execution instance (e.g. a process), may include execution privilege, such as a permission to perform an action or access a processing resource. Examples of various privileges may include the ability to create a file in a directory, or to read or delete a file, access a device, or have read or write permission to a socket for communicating over the network. A process may acquire a privilege dynamically by performing a successful verification using, for example, an encryption key, a pass code or other cryptographic or security settings. Privileges may be dynamically distributed among processes based on a voucher mechanism.

In one embodiment, a daemon may be launched in the background running in a low (or restricted) privilege (e.g. via a least privileged model). The daemon may wait for donations of higher privileges from other processes via vouchers. During different periods of time, the daemon may run with different privileges (e.g. incompatible or compatible privileges) according to vouchers received. Incompatible privileges when combined may render a process incapable of performing operations as intended for each individual privilege. For example, a first privilege allowing access to a first file but not access to a second file may be incompatible with a second privilege allowing access to the second file but no access to the first file. Vouchers may grant privileges to enable a daemon to perform operations for different privileges separately without a need to combine these privileges together. In one embodiment, vouchers may grant restricted privileges but may not restrict privileges.

In one embodiment, vouchers may also be used to transfer thread group membership. For example, when a thread of process 213 communicates via the IPC module 125 with a thread of process 217, the thread can optionally pass a voucher that references a thread group to join. Furthermore, when a first thread wakes a second thread to do work on behalf of the first thread, the second thread can adopt the thread group of the first thread. When a first thread makes a second thread runnable, the second thread can adopt the thread group of the first thread.

Figure 2B:
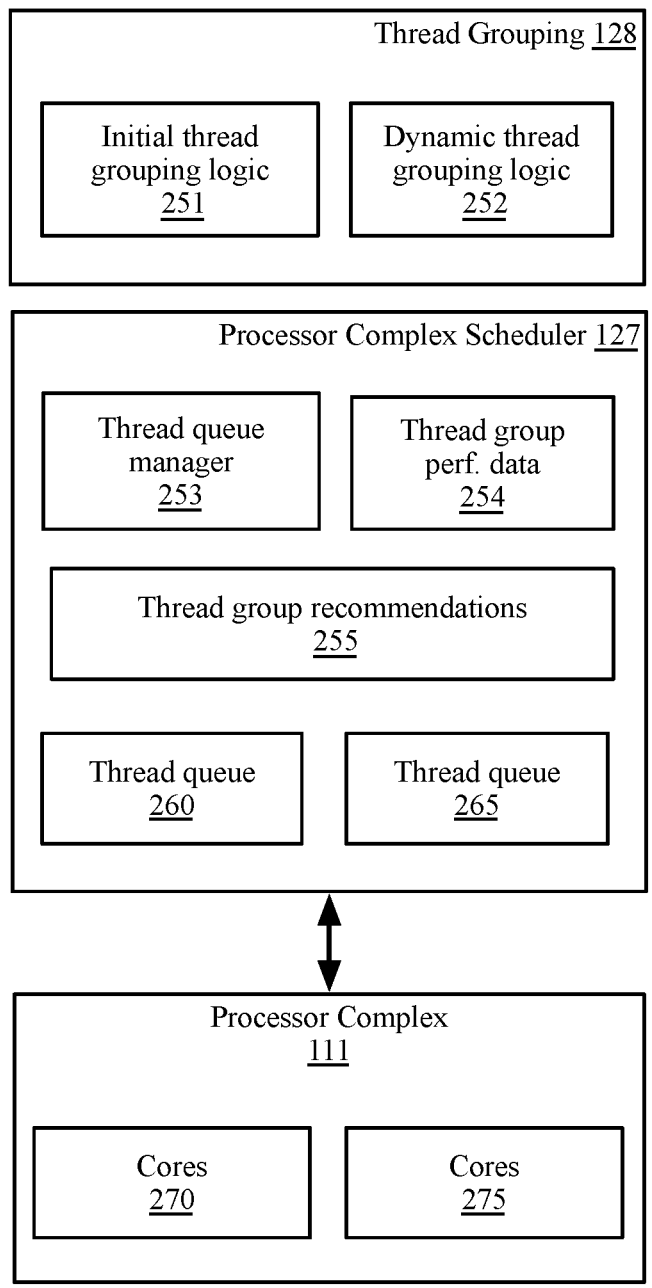
FIG. 2B illustrates a system 250 for processing threads having thread groups on a processor complex, according to some embodiments.

FIG. 2B illustrates a system 250 for processing threads having thread groups on a processor complex, according to some embodiments. System 250 can include a processor complex scheduler 127, thread grouping logic 128, and a processor or CPU, such as processor complex 111. Processor complex 111 can comprise a plurality of processor core types of an asymmetric multiprocessing system (AMP) or a symmetric multiprocessing system (SMP).

Thread grouping logic 128 can include initial thread grouping logic 251 and dynamic thread grouping logic 252. A thread group is a group of one or more threads that are grouped together based on one or more characteristics that are used to determine a common goal or purpose of the threads in the thread group. In one embodiment, threads that are associated with a well-known functionality are grouped together into a thread group. Well-known functionality can include, for example, a library, API, or framework that is directed to video processing, audio processing, rendering, input/output (I/O) for block storage devices. Initial thread grouping logic 251 can analyze threads and assign initial thread groups in accordance with the analysis.

Threads can dynamically change thread group and can be restored to their original thread groups at a later time. In an embodiment, threads need not be restored to their original thread groups. Dynamic thread grouping logic 252 can dynamically re-assign threads to different thread groups. In one embodiment, when a second thread is called to perform work on behalf of a first thread, the second thread may optionally adopt (e.g., opt-in to) the thread group of the first thread. A thread that opts-in a thread group may later opt-out of the thread group and return to its previous thread group. Dynamic thread grouping can also be performed based on whether a thread performing work having a common purpose with a work interval object (WIO) 135. A work interval object (WIO) is an object that is used to represent periodic work where each period has a deadline. The WIO possesses a token and a specified time interval for one instance of the work. The WIO can be associated with a thread group. The thread group can either be created specifically for the WIO, or the WIO can be associated with an existing thread group. Threads that work to achieve a common purpose, intended to be performed within the specified time interval, can join the thread group of the WIO.

Processor complex scheduler 127 can include a thread queue manager 253, thread group performance data manager 254, thread group recommendation manager 255, and a plurality of thread queues for each of a plurality of processor core. In one embodiment, for example, where processor complex 111 is an asymmetric multiprocessing system, processor complex scheduler 127 can have a first thread queue 260 and a second thread queue 265 that correspond with cores 270 and 275 respectively. Processor complex scheduler 127 thread queue manager 253 can then manage the scheduling of threads for each of the plurality of cores types of processor complex 111 using the different thread queues. For symmetric multiprocessing system, first thread queue 260 and second thread queue 265 may be merged, or separate queues may be maintained to enable certain threads or thread groups to be funneled to specific groups of cores.

Thread group performance data manager 254 of the processor complex scheduler 127 can collect thread execution metrics for each of a plurality of thread groups executing on processor complex 111. A plurality of thread execution metrics can be sampled from the collected thread execution metrics of thread group performance data manager 254 and provided to a plurality of tunable controllers for each thread group. Processor complex scheduler 127 thread group recommendation manager 255 can receive core type (cluster) recommendations for each thread group that has been active on processor complex 111. The thread queue manager 253 can utilize the cluster recommendations for each thread group to program threads of each thread group onto an appropriate core queue (e.g. 260 or 265).

Multi-Level Scheduler

Figure 3A:
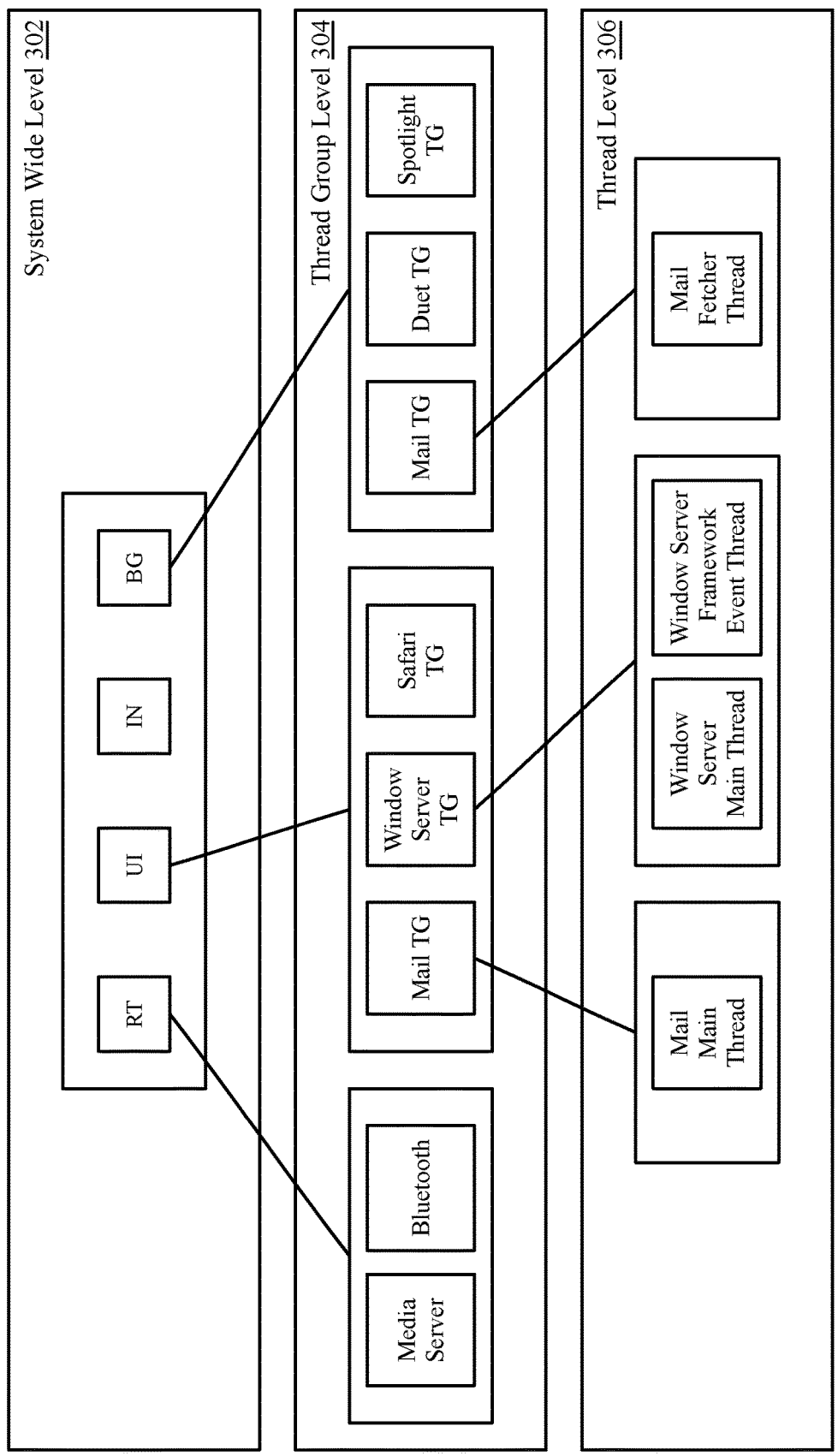
FIG. 3A is a schematic illustration of a multi-level scheduling system, according to embodiments.

FIG. 3A is a schematic illustration of a multi-level scheduling system 300, according to embodiments. The multi-level scheduling system 300 includes classifications at a system-wide level 302 that facilitate the scheduling at the thread group level 304 and thread level 306. In one embodiment the classifications at the system-wide level 302 are quality of service (QoS) classifications that include a real-time (RT) class, a user interactive (UI) class, a user initiated (IN) class, and a background (BG) class. The RT class may be assigned to high-priority tasks that should be executed in real time. The UI class may execute at a slightly lower system priority than, for example, a RT class, but at a higher priority than tasks in the lower QoS classes. The IN class can be assigned to tasks that are initiated by a user but are not directly interactive. Tasks in the IN class are executed at a high priority, but not as high of a priority as UI tasks. Thus, a task in the IN class can preempt all other user tasks other than user UI tasks. The background class can be assigned to low-priority tasks that provide services to the user. The user may not be directly aware of the operation of the background tasks.

The set of illustrated tasks are exemplary QoS classifications for application tasks, but are not intended to be limiting as to all embodiments, as an application may use fewer or more tasks having different classifications than shown. Moreover, the tasks may be configured to operate on a variety of data processing system hardware.

In some embodiments, an additional set of QoS classes may be available to application developers and an additional set of classes is available only to the operating system of the data processing system. For example, an A/V rendering class can be assigned to system-initiated tasks that perform audio or video rendering. The operating system can classify some rendering tasks at a higher priority than any user interactive task to maintain a quality multimedia experience when the system is under heavy load. Similarly, an audio rendering task, such as a compressed audio decoder, can be assigned the A/V rendering QoS classification and operations performed by the task may preempt other tasks to prevent resource contention related interruptions to music playback. If a video is to be played on a computing device, a video player can be presented as the foreground application. The video decode and post processing tasks performed by the operating system in support of audio and video rendering can be assigned to the A/V rendering classification. The tasks in the A/V rendering class can be allowed to preempt tasks in all of the other QoS classifications.

In some embodiments, a maintenance class is available to the operating system for tasks that are to perform operations below the priority of the background class. Tasks in the maintenance class can be preempted by tasks in all other QoS classifications. An exemplary maintenance class task is file system indexing. A file system indexing task can be performed by a system utility to index the contents of a storage device, which facilitates searches through the contents of the file system. This type of indexing may be used by a search application such as "Spotlight" from Apple Inc. of Cupertino, Calif.

The QoS classification and relative priority can be stored in a data structure associated with each task and retrieved when performing priority dependent operations. In one embodiment, the QoS classification and relative priority are stored as a tuple value. In one embodiment, each combined QoS class and relative priority resolves to an integer value, allowing the relative priority of a set of classes to be arithmetically determined using comparison operations.

In one embodiment, each of the system-wide level classes can map to a plurality of thread groups at the thread group level 304 which, in turn, map to a plurality of threads at the thread level 306. In some examples a scheduler may be adapted to manage scheduling at a system-wide level 302, a thread group level 304, and a thread level 306. Broadly, threads related to the same class may be aggregated into buckets and scheduled collectively. At the system-wide level 302 the scheduler may pick a global class of threads to execute and implement a selection algorithm that allows the scheduler to partition the system and to provide an approximate notion of central processing unit (CPU) allocation for various Quality-of-Service (QoS) bands.

Similarly, threads within the buckets that are related to the same workload may be aggregated into thread groups and scheduled at the thread group level 304. At the thread group level 304, once a class has been selected for execution, the scheduler picks a thread group within the class that has runnable threads for execution. This allows the scheduler to implement various policies such as choosing threads belonging to application thread groups over threads belonging to daemon thread groups, even if they are of the same priority. It also allows the scheduler to timeshare among thread groups efficiently based at least in part on CPU utilization.

Finally, threads from a thread group may be selected for execution at the thread level based on a variety of factors. At the thread level 306, if a thread group has multiple threads of the same class, the scheduler chooses one of the threads to execute based on one or more factors. Further details are described below.

Figure 3B:
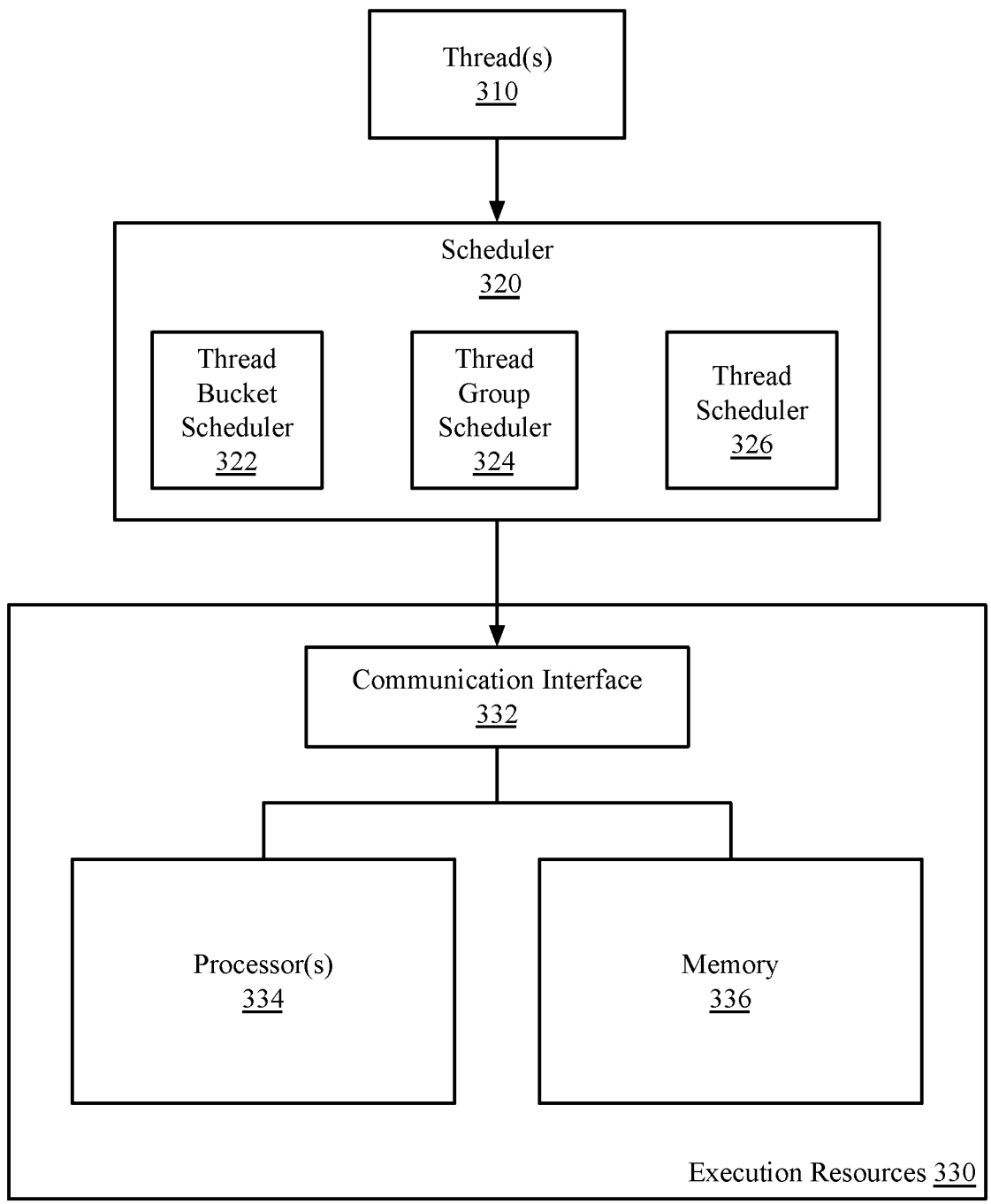
FIG. 3B is a schematic illustration of an architecture of components a data processing system in which multi-level scheduling may be implemented, according to embodiments.

FIG. 3B is a schematic illustration of an architecture of components the multi-level scheduling system 300, according to embodiments. A scheduler 320, which may correspond to the processor complex scheduler 127 of FIG. 1, can receive execution threads 310 for scheduling. The scheduler 320 can include a thread bucket scheduler 322 to manage thread scheduling at the system-wide level 302, a thread group scheduler 324 to manage thread scheduling at the thread group level 304, and a thread scheduler 326 to manage thread scheduling at the thread level 306. The thread scheduler is communicatively coupled to execution resources 330 which may include a communication interface 332, one or more processors 334, and a memory 336.

Having described various structures of a data processing system which may be adapted to implement multi-level scheduling, operating aspects will be explained with reference to FIGS. 4A-4B and 5-8, which are flowcharts illustrating operations in a method to implement multi-level scheduling according to embodiments. In some embodiments the operations depicted in the flowchart of FIGS. 4A-4B and 5-8 may be implemented by the respective schedulers 322, 324, 326 described in FIG. 3B.

Figure 4A:
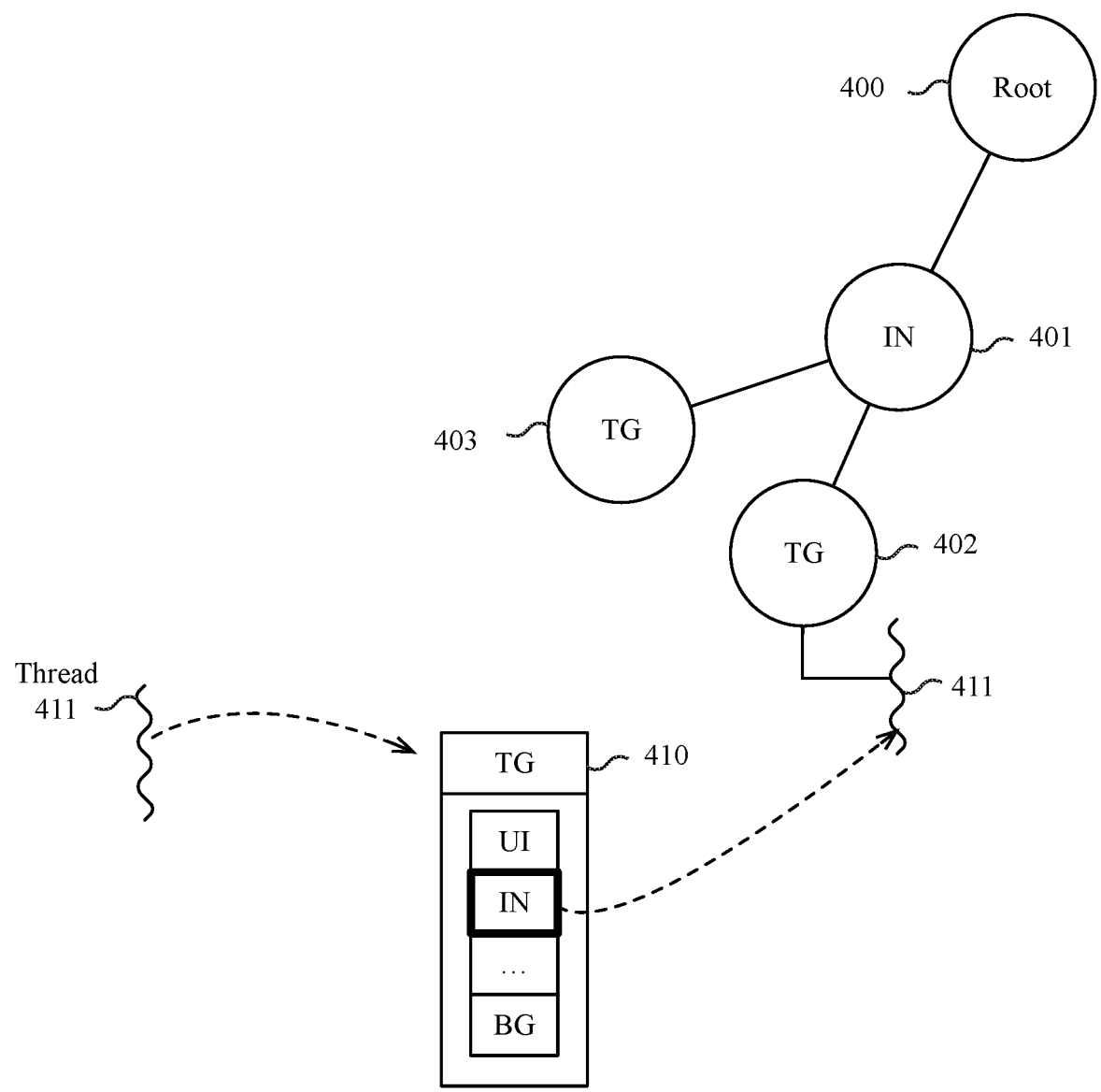
FIG. 4A is a flow diagram of a method for multi-level scheduling, according to embodiments.

Referring to FIG. 4A, the multi-level scheduler described herein can have the illustrated multi-level scheduler hierarchy. When a thread 411 is made runnable, the scheduler examines the thread group structure 410 for the thread. The thread group structure 410 includes the buckets to which threads in the thread group are assigned. A bucket for the thread is determined based on thread QoS classification and the thread is placed in the multi-level scheduler hierarchy at a position that corresponds with the thread group and the bucket for the thread.

For example, an exemplary multi-level scheduler hierarchy can include a root 400 to which all root buckets in a system are attached. Root 400 can have child nodes (e.g., root buckets) that corresponds to the buckets associated with each runnable thread. For example, root bucket 401 corresponds to all runnable threads of the IN class. Root bucket 401 has child nodes that correspond to the thread groups containing runnable threads of the IN class. Each thread group with runnable threads within a bucket is represented as an entry at this level. In some examples these entries are referred to as clutch buckets. For example, clutch bucket 402 can correspond with thread group structure 410. Clutch bucket 402 can store all runnable threads from thread group structure 410 that are of the IN class. Other clutch buckets (e.g., clutch bucket 403) can correspond to different thread groups and can include threads of those thread groups of the IN class. During operation, when thread 411 becomes runnable, the thread is placed into the illustrated multi-level scheduler hierarchy and the root bucket 401 corresponding to thread 411 is also made runnable. Scheduler operation within this hierarchy is described in FIG. 4B.

Figure 4B:
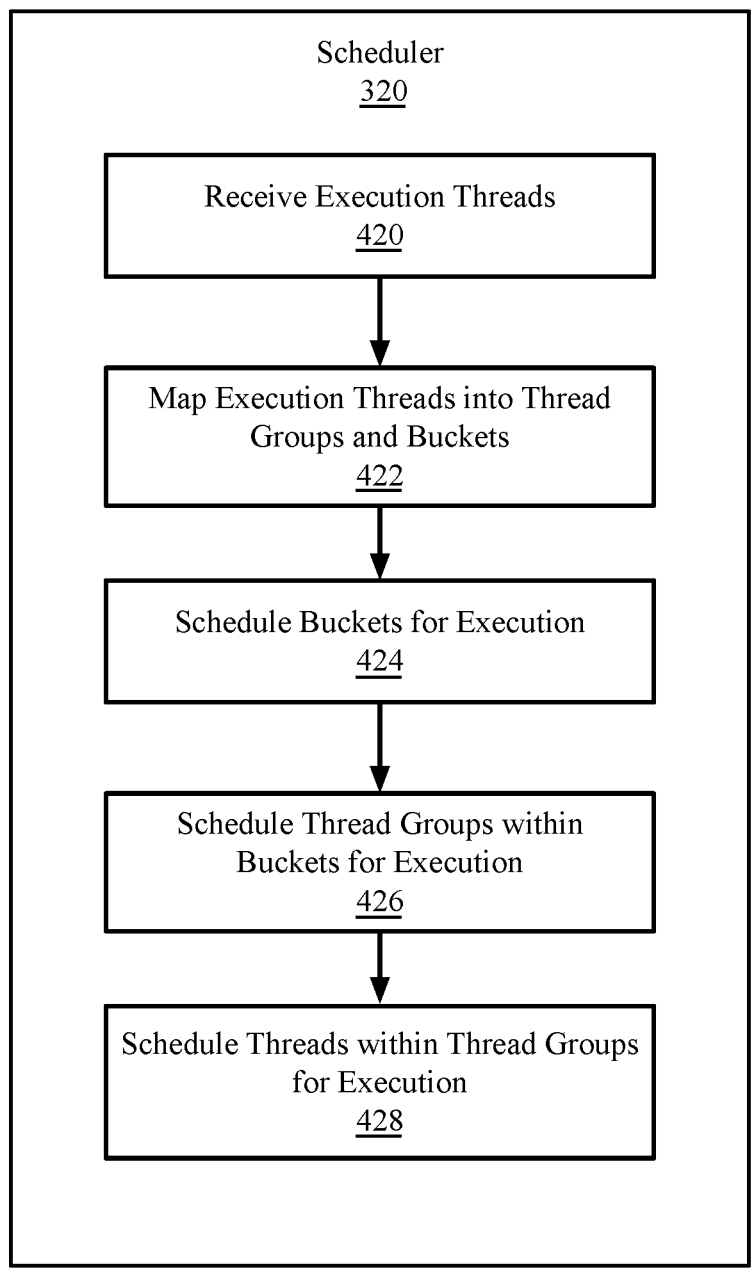
FIG. 4B illustrates a thread scheduler hierarchy for the multi-level scheduler, according to an embodiment.

Referring to FIG. 4B, in some embodiments a scheduler 320 receives execution threads for execution on the execution resources 330 of the data processing system 300. Each respective execution thread may be associated with QoS classes which characterize a QoS level for the execution thread.

Figure 5:
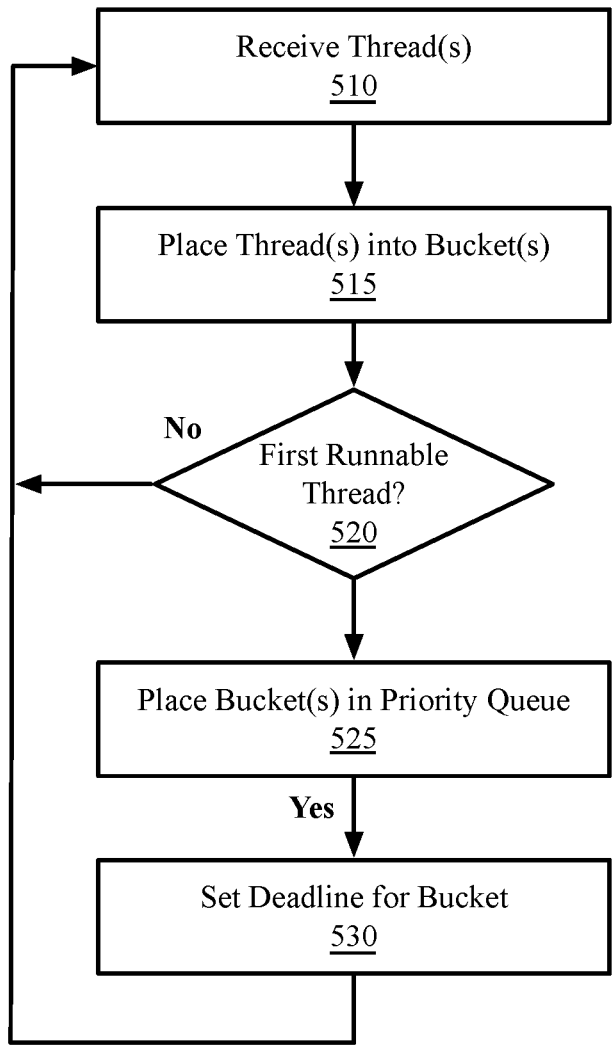
FIG. 5 is a flow diagram of a method for multi-level scheduling, according to embodiments.
Figure 6:
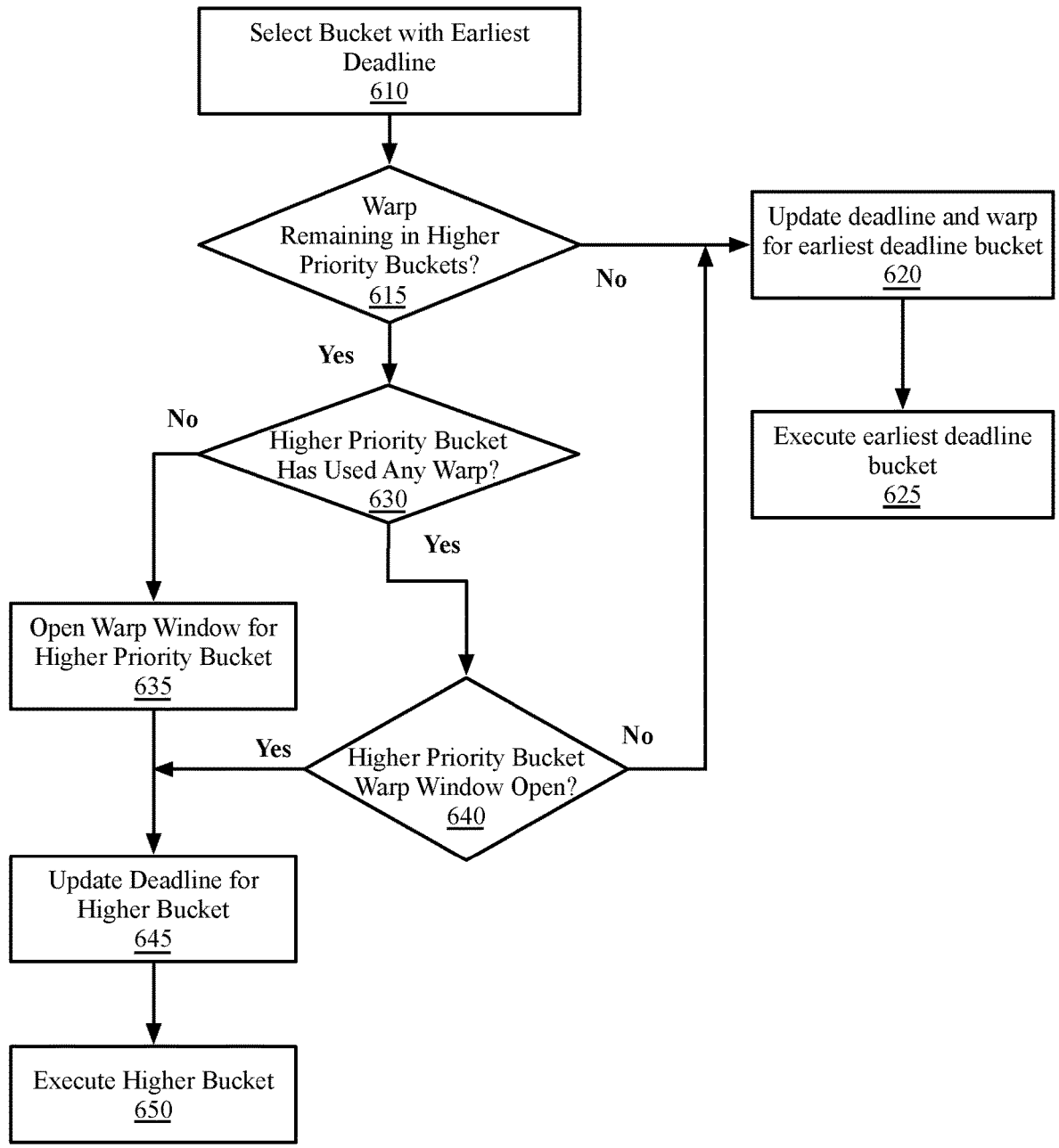
FIG. 6 is a flow diagram of a method for multi-level scheduling, according to embodiments.

At operation 422 the thread group scheduler 324 maps the execution threads received in operation 420 into one or more thread groups based on the work to be performed by the thread and thread bucket scheduler 322 maps the execution threads into one or more buckets based at least in part on the QoS class associated with the respective execution thread. At operation 424 the thread bucket scheduler 322 schedules buckets for execution in order to manage scheduling at the system-wide level 302. At operation 426 the thread group scheduler 324 schedules thread groups with the buckets for execution in order to manage scheduling at the thread group level 304. At operation 428 the thread scheduler 326 schedules threads within the thread group to manage scheduling at the thread level 306. Each of these operations will be described in greater detail below. FIGS. 5-6 illustrate operations implemented by the thread bucket scheduler 322. Referring to FIG. 5, at operation 510 one or more execution threads are received in the scheduler 320. At operation 515 the bucket scheduler 322 places the received threads into one or more execution buckets based at least in part on the scheduling priority of the execution threads. In some examples the buckets may correspond to QoS classes used by the operating system runtime to define performance expectations for tasks. At operation 520 the thread buckets are placed into a priority queue. In some embodiments all runnable threads within the same scheduling bucket may be represented by a single entry in the priority queue. In some embodiments, the buckets may be referred to as root buckets.

At operation 520 the bucket scheduler 322 determined whether a particular bucket has one or more runnable threads. If, at operation 520, the bucket has no runnable threads then the bucket scheduler can return to operation 510. By contrast, when the first thread becomes runnable, control passes to operation 525 and the buckets can be placed in the priority queue. In some embodiments all runnable threads within the same scheduling bucket may be represented by a single entry in the priority queue. In some embodiments, the buckets may be referred to as root buckets. Control can then pass to operation 530 and the thread scheduler 322 sets a deadline for the bucket. In some examples the scheduling bucket 322 calculates the deadline for a bucket based on the first-runnable timestamp and a worst-case execution latency (WCEL) value, which is predefined for each bucket. In some examples the WCEL values may be selected based on a decay curve followed by the Mach timesharing algorithm. Whenever a bucket transitions from non-runnable to runnable, its deadline is set to the current time plus the WCEL value for the bucket. This ensures that the bucket would be scheduled at the WCEL value for the bucket, even in a heavily loaded system.

Once the deadline is set control passes back to operation 510. Thus, operations 510-530 define a loop pursuant to which the bucket scheduler 322 receives execution threads, groups the execution threads into buckets, and places the buckets into a priority queue with an execution deadline.

In some embodiments the bucket scheduler 322 implements an Earliest Deadline First (EDF) algorithm to select buckets from the priority queue for execution. The priority of the root bucket corresponds to the deadline of the root bucket, which is calculated by adding the WCEL of the bucket to the timestamp of the root bucket becoming runnable, as indicated in Equation (1).

$$\text{Root-bucket priority} = \text{current timestamp} + \text{WCEL[bucket]} \quad \text{EQ 1}$$

In some embodiments, in a heavily loaded system it is possible that high priority buckets will have consumed enough of the execution resources 330 to fall behind buckets of lower priority in the deadline order of the priority queue. In this circumstance, if a small burst of user critical workload arrives in the priority queue the higher-priority bucket has to wait for the lower-priority buckets to execute before being assigned execution resources 330, which can lead to performance issues. To address this issue, the bucket scheduler implements a root bucket warp mechanism. Operation of the root bucket warp mechanism is shown in FIG. 6.

Referring to FIG. 6, at operation 610 the bucket scheduler 322 selects the bucket with the earliest deadline in the priority queue. At operation 615 the bucket scheduler 322 determines whether there are any higher priority buckets that have warp remaining. If, at operation 615, there is no warp remaining in higher priority buckets, then control passes to operation 620 to update the deadline and warp for the earliest deadline bucket. Control then proceeds to operation 625 in which the buckets are executed in deadline order, with the earliest deadline bucket being executed first. By contrast, if at operation 615 there is warp remaining in higher priority buckets, control passes to operation 630 and the bucket scheduler 322 determines whether a higher priority bucket has used any warp. If, at operation 630, a higher priority bucket has used any warp, control passes to operation 640, where the bucket scheduler 322 determines whether a higher priority bucket warp window is open. If, at operation 640, a higher priority bucket warp window is not open, control passes to operation 620 described above. If, at operation 630, a higher priority bucket has not used any warp, control passes to operation 635, where the bucket scheduler 322 will open a warp window for the higher priority bucket. After operation 635, or if at operation 640 the bucket scheduler 322 determines that a higher priority bucket warp window is open, control passes to operation 645, where the bucket scheduler 322 will update the deadline for the higher bucket. The bucket scheduler 322 then proceeds to operation 650 to execute the higher priority bucket.

The EDF selection and scheduling algorithm described herein allows the bucket scheduler 322 to define strict bounds on worst-case execution latencies for all scheduling buckets. It is also dynamic based on bucket runnability and selection. Since deadline updates are computationally cheap, the EDF algorithm can maintain up-to-date information without measurable overhead. Further, the EDF algorithm maintains low scheduling latency for high buckets and starvation avoidance for low-priority buckets. Since the bucket level scheduler deals with a fixed small number of runnable buckets in the worst case, it is easy to configure in terms of defining deadlines, warps etc.

Thread group level scheduling is managed by the thread group scheduler 324, which determines which thread groups within a bucket should be selected for execution. Thread groups represent a collection of threads working on behalf of a specific workload. Each thread group with runnable threads within a clutch bucket is represented as an entry at this level. In some embodiments the thread group scheduler implements an algorithm to share the execution resources 330 among various user workloads with preference to interactive applications over compute-intensive batch workloads.

Figure 7:
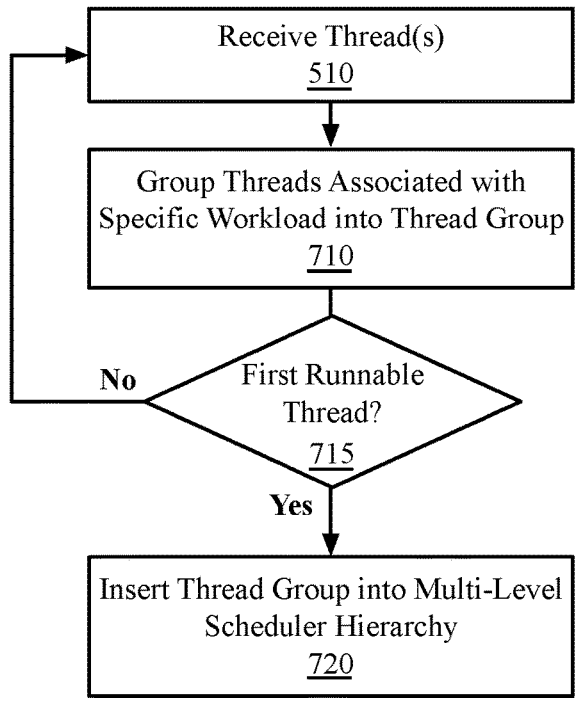
FIG. 7 is a flow diagram of a method for multi-level scheduling, according to embodiments.

Referring to FIG. 7, operation 510 can be performed, as in FIG. 5, in which threads are received for execution. At operation 710 threads associated with a specific workload are grouped into a thread group. At operation 715 the thread group scheduler 324 determines when a first thread in the thread groups becomes runnable. If, at operation 715, the thread groups have no runnable threads then the thread group scheduler 324 returns to operation 510 until additional threads are received. When the first thread in the thread group becomes runnable, at operation 715 then control passes to operation 720 and the thread group is inserted into the multi-level scheduler hierarchy.

In one embodiment the thread group scheduler 324 implements a variation of the FreeBSD ULE scheduler to decide which thread group should be selected next for execution. Each clutch bucket with runnable threads is represented as an entry in a priority queue which is ordered by thread group priorities. The priority calculation for the clutch buckets is based on multiple factors. One factor is the highest runnable thread in the thread group. The thread group scheduler 324 maintains the runnable threads in clutch priority order and uses the highest base/sched priority for its priority calculation. The use of both base and schedule priority allows the thread group scheduler 324 to honor priority differences specified from userspace via SPIs, priority boosts due to priority inheritance mechanisms like turnstiles, and other priority affecting mechanisms outside the core scheduler.

Another factor is an interactivity score. In some embodiments the thread group scheduler 324 calculates an interactivity score based on a ratio of blocking time and CPU usage time for the thread group as a whole. This score allows the scheduler to prefer highly interactive thread groups over batch processing compute intensive thread groups.

Another factor is a thread group type. To improve battery life on devices, the operating system may mark daemon thread groups as "Efficient." These thread groups typically represent work that is not directly related to a user requested workload. The scheduler de-prioritizes these thread groups over others by factoring this into the priority calculation.

The interactivity score-based algorithm implemented by the thread group scheduler allows for a fair sharing of execution resources 330 among thread groups based on recent behavior of the thread groups. Since the algorithm is based on recent CPU usage history, it also adapts to changing behavior quickly. Also, since the priority calculation is fairly cheap, the scheduler is able to maintain up-to-date information about all thread groups, which leads to better scheduling decisions. Thread groups provide a convenient abstraction for groups of threads working together for a user workload. Basing scheduling decisions on this abstraction allows the system to make interesting choices such as preferring Apps over daemons which is typically better for system responsiveness.

The priority value of a clutch bucket into which threads of a thread group having a specific classification are inserted can be is calculated based on the highest runnable thread interactivity score and the thread group type. The calculation algorithm finds the highest runnable schedpri/basepri in the clutch bucket (i.e., maxpri), then checks if the thread group for this clutch bucket is marked as being efficient. If not, a positive boost value (clutch_boost) is assigned. Next the ratio of CPU blocked to CPU used is calculated for the thread group. If the ratio is greater than 1, then a score (interactivity_score) in the higher range is assigned. If not, then a score (interactivity_score) in the lower range is assigned. In one embodiment, the clutch bucket priority can be determined by Equation (2):

$$\text{Clutch-bucket priority} = \text{maxpri} + \text{clutch\_boost} + \text{interactivity\_score} \qquad \text{EQ2}$$

Thread Priority Calculations

Thread level scheduling is managed by the thread scheduler 326. If a thread group has multiple threads at the same class, the scheduler chooses one of those threads to run. The selection of the thread to execute can be based on a variety of factors such as earliest realtime deadline, recent CPU usage etc. The thread scheduler 326 is configured provide fairness among threads which are all serving the same workload by timesharing between those threads.

Figure 8:
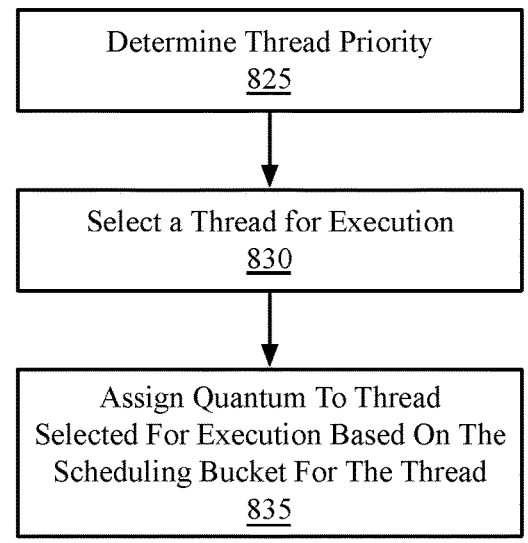
FIG. 8 is a flow diagram of a method for multi-level scheduling, according to embodiments.

Referring to FIG. 8, at operation 825, the thread scheduler 326 determines a thread priority for threads to be executed. The thread priority calculation is based on the Mach timesharing algorithm and is calculated by first taking a snapshot of the load for the thread group for every scheduler tick. This load value is used to calculate priority shift values for all threads in the thread group. The thread priority is then given by Equation (3):

$$\text{Thread priority} = \text{base priority} - (\text{thread CPU usage} \gg \text{priority shift}) \qquad \text{EQ3}$$

The load information is updated every scheduler tick and the threads use this information for priority decay calculation as the threads are executed on the CPU. The priority decay algorithm attempts to reward interactive threads that usually exhibit short bursts in demand, while penalizing CPU intensive threads.

Runnable threads in a clutch bucket are inserted into the runqueue based on the schedpri. In one embodiment the thread level scheduler implements the Mach timesharing algorithm to decide which thread within the clutch bucket should be selected next for execution, although other algorithms may be used. The scheduler calculates the schedpri of the threads in a clutch bucket based on the CPU load information (e.g., number of runnable threads in the clutch bucket) and the CPU usage of individual threads. The thread scheduler 326, at operation 830, can then select a thread for execution. The thread scheduler can then, at operation 835, assign a quantum to the thread selected for execution based on the scheduling bucket for the thread. Once a thread is selected for running, it is assigned a quantum which is based on the scheduling bucket it belongs to, as shown at operation 835. In some examples the per-bucket thread quantum allows the thread scheduler to bound the worst-case execution latency for a low priority thread which has been starved by higher priority threads.

Additional Exemplary Computing Devices

Figure 9:
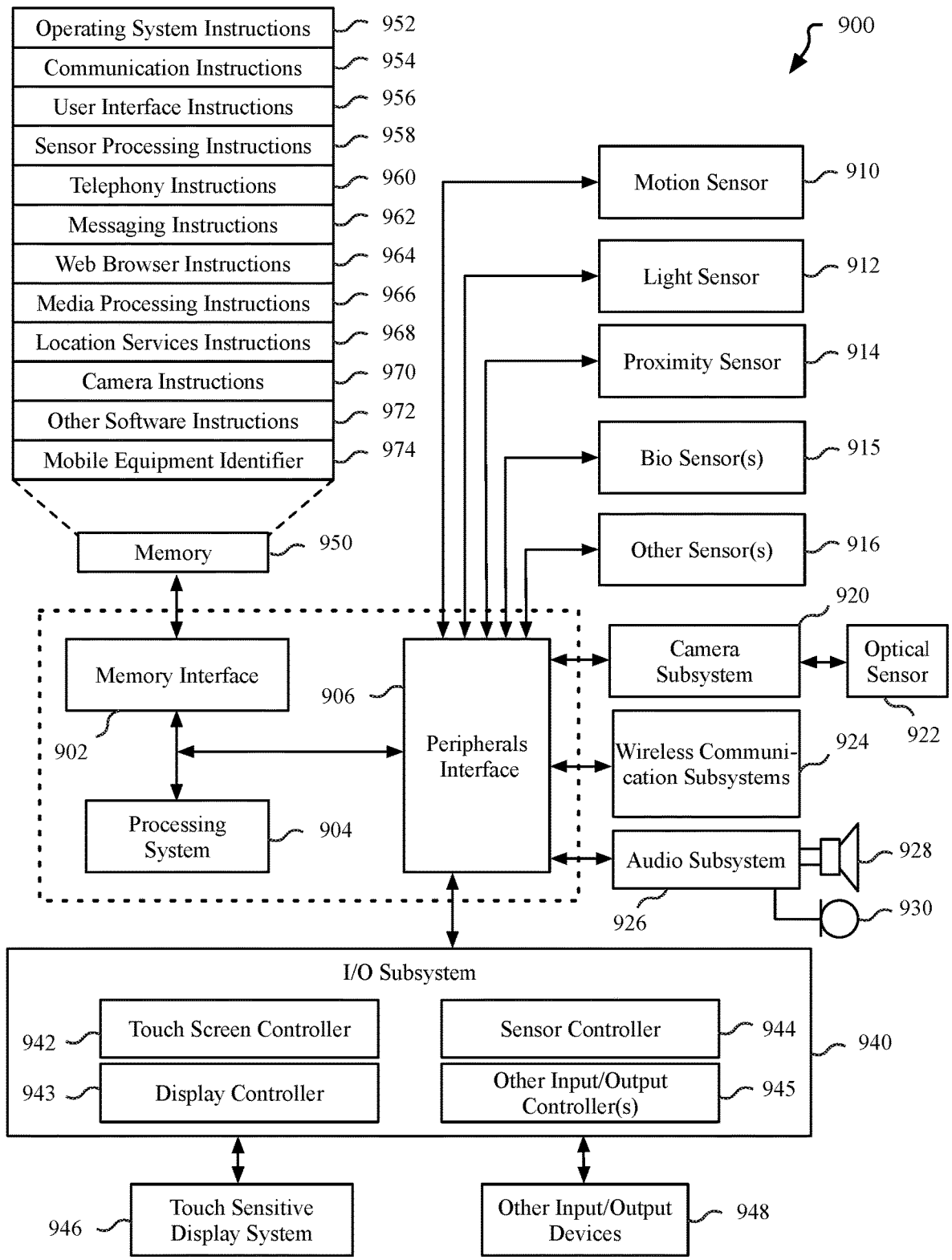
FIG. 9 is a block diagram of a device architecture for a mobile or embedded device, according to an embodiment.

FIG. 9 is a block diagram of a device architecture 900 for a mobile or embedded device, according to an embodiment. The device architecture 900 includes a memory interface 902, a processing system 904 including one or more data processors, image processors and/or graphics processing units, and a peripherals interface 906. The various components can be coupled by one or more communication buses or signal lines. The various components can be separate logical components or devices or can be integrated in one or more integrated circuits, such as in a system on a chip integrated circuit.

The memory interface 902 can be coupled to memory 950, which can include high-speed random-access memory such as static random-access memory (SRAM) or dynamic random-access memory (DRAM) and/or non-volatile memory, such as but not limited to flash memory (e.g., NAND flash, NOR flash, etc.).

Sensors, devices, and subsystems can be coupled to the peripherals interface 906 to facilitate multiple functionalities. For example, a motion sensor 910, a light sensor 912, and a proximity sensor 914 can be coupled to the peripherals interface 906 to facilitate the mobile device functionality. One or more biometric sensor(s) 915 may also be present, such as a fingerprint scanner for fingerprint recognition or an image sensor for facial recognition. Other sensors 916 can also be connected to the peripherals interface 906, such as a positioning system (e.g., GPS receiver), a temperature sensor, or other sensing device, to facilitate related functionalities. A camera subsystem 920 and an optical sensor 922, e.g., a charged coupled device (CCD) or a complementary metal-oxide semiconductor (CMOS) optical sensor, can be utilized to facilitate camera functions, such as recording photographs and video clips.

Communication functions can be facilitated through one or more wireless communication subsystems 924, which can include radio frequency receivers and transmitters and/or optical (e.g., infrared) receivers and transmitters. The specific design and implementation of the wireless communication subsystems 924 can depend on the communication network(s) over which a mobile device is intended to operate. For example, a mobile device including the illustrated device architecture 900 can include wireless communication subsystems 924 designed to operate over a GSM network, a CDMA network, an LTE network, a Wi-Fi network, a Bluetooth network, or any other wireless network. In particular, the wireless communication subsystems 924 can provide a communications mechanism over which a media playback application can retrieve resources from a remote media server or scheduled events from a remote calendar or event server.

An audio subsystem 926 can be coupled to a speaker 928 and a microphone 930 to facilitate voice-enabled functions, such as voice recognition, voice replication, digital recording, and telephony functions. In smart media devices described herein, the audio subsystem 926 can be a high-quality audio system including support for virtual surround sound.

The I/O subsystem 940 can include a touch screen controller 942 and/or other input controller(s) 945. For computing devices including a display device, the touch screen controller 942 can be coupled to a touch sensitive display system 946 (e.g., touch-screen). The touch sensitive display system 946 and touch screen controller 942 can, for example, detect contact and movement and/or pressure using any of a plurality of touch and pressure sensing technologies, including but not limited to capacitive, resistive, infrared, and surface acoustic wave technologies, as well as other proximity sensor arrays or other elements for determining one or more points of contact with a touch sensitive display system 946. Display output for the touch sensitive display system 946 can be generated by a display controller 943. In one embodiment, the display controller 943 can provide frame data to the touch sensitive display system 946 at a variable frame rate.

In one embodiment, a sensor controller 944 is included to monitor, control, and/or processes data received from one or more of the motion sensor 910, light sensor 912, proximity sensor 914, or other sensors 916. The sensor controller 944 can include logic to interpret sensor data to determine the occurrence of one of more motion events or activities by analysis of the sensor data from the sensors.

In one embodiment, the I/O subsystem 940 includes other input controller(s) 945 that can be coupled to other input/control devices 948, such as one or more buttons, rocker switches, thumb-wheel, infrared port, USB port, and/or a pointer device such as a stylus, or control devices such as an up/down button for volume control of the speaker 928 and/or the microphone 930.

In one embodiment, the memory 950 coupled to the memory interface 902 can store instructions for an operating system 952, including portable operating system interface (POSIX) compliant and non-compliant operating system or an embedded operating system. The operating system 952 may include instructions for handling basic system services and for performing hardware dependent tasks. In some implementations, the operating system 952 can be a kernel.

The memory 950 can also store communication instructions 954 to facilitate communicating with one or more additional devices, one or more computers and/or one or more servers, for example, to retrieve web resources from remote web servers. The memory 950 can also include user interface instructions 956, including graphical user interface instructions to facilitate graphic user interface processing.

Additionally, the memory 950 can store sensor processing instructions 958 to facilitate sensor-related processing and functions; telephony instructions 960 to facilitate telephone-related processes and functions; messaging instructions 962 to facilitate electronic-messaging related processes and functions; web browser instructions 964 to facilitate web browsing-related processes and functions; media processing instructions 966 to facilitate media processing-related processes and functions; location services instructions including GPS and/or navigation instructions 968 and Wi-Fi based location instructions to facilitate location based functionality; camera instructions 970 to facilitate camera-related processes and functions; and/or other software instructions 972 to facilitate other processes and functions, e.g., security processes and functions, and processes and functions related to the systems. The memory 950 may also store other software instructions such as web video instructions to facilitate web video-related processes and functions; and/or web shopping instructions to facilitate web shopping-related processes and functions. In some implementations, the media processing instructions 966 are divided into audio processing instructions and video processing instructions to facilitate audio processing-related processes and functions and video processing-related processes and functions, respectively. A mobile equipment identifier, such as an International Mobile Equipment Identity (IMEI) 974 or a similar hardware identifier can also be stored in memory 950.

Each of the above identified instructions and applications can correspond to a set of instructions for performing one or more functions described above. These instructions need not be implemented as separate software programs, procedures, or modules. The memory 950 can include additional instructions or fewer instructions. Furthermore, various functions may be implemented in hardware and/or in software, including in one or more signal processing and/or application specific integrated circuits.

Figure 10:
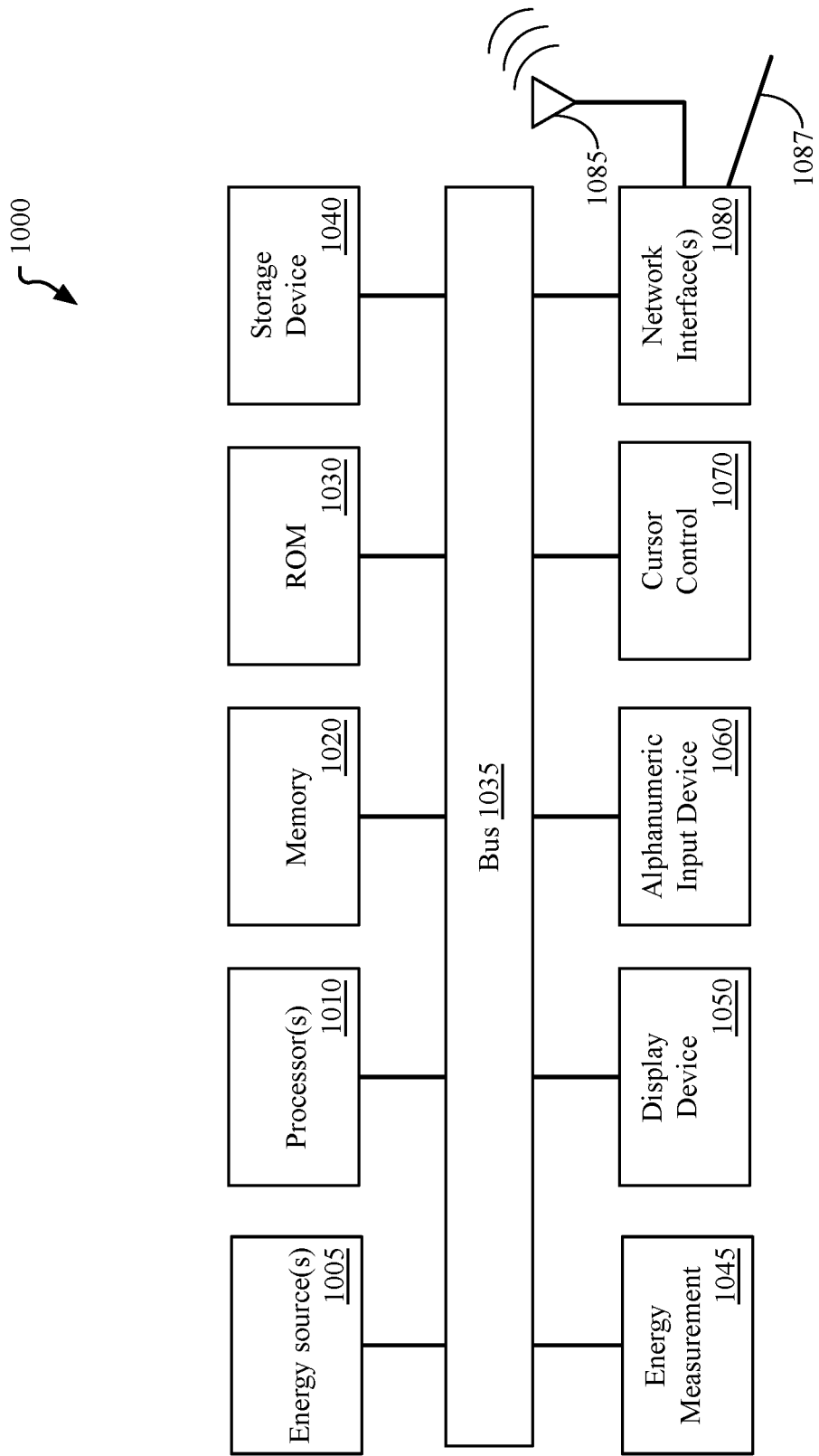
FIG. 10 is a block diagram of a computing system, according to an embodiment.

FIG. 10 is a block diagram of a computing system 1000, according to an embodiment. The illustrated computing system 1000 is intended to represent a range of computing systems (either wired or wireless) including, for example, desktop computer systems, laptop computer systems, tablet computer systems, cellular telephones, personal digital assistants (PDAs) including cellular-enabled PDAs, set top boxes, entertainment systems or other consumer electronic devices, smart appliance devices, or one or more implementations of a smart media playback device. Alternative computing systems may include more, fewer and/or different components. The computing system 1000 can be used to provide the computing device and/or a server device to which the computing device may connect.

The computing system 1000 includes bus 1035 or other communication device to communicate information, and processor(s) 1010 coupled to bus 1035 that may process information. While the computing system 1000 is illustrated with a single processor, the computing system 1000 may include multiple processors and/or co-processors. The computing system 1000 further may include memory 1020 in the form of random-access memory (RAM) or other dynamic storage device coupled to the bus 1035. The memory 1020 may store information and instructions that may be executed by processor(s) 1010. The memory 1020 may also be main memory that is used to store temporary variables or other intermediate information during execution of instructions by the processor(s) 1010.

The computing system 1000 may also include read only memory (ROM) 1030 and/or another data storage device 1040 coupled to the bus 1035 that may store information and instructions for the processor(s) 1010. The data storage device 1040 can be or include a variety of storage devices, such as a flash memory device, a magnetic disk, or an optical disc and may be coupled to computing system 1000 via the bus 1035 or via a remote peripheral interface.

The computing system 1000 may also be coupled, via the bus 1035, to a display device 1050 to display information to a user. The computing system 1000 can also include an alphanumeric input device 1060, including alphanumeric and other keys, which may be coupled to bus 1035 to communicate information and command selections to processor(s) 1010. Another type of user input device includes a cursor control 1070 device, such as a touchpad, a mouse, a trackball, or cursor direction keys to communicate direction information and command selections to processor(s) 1010 and to control cursor movement on the display device 1050. The computing system 1000 may also receive user input from a remote device that is communicatively coupled via one or more network interface(s) 1080.

The computing system 1000 further may include one or more network interface(s) 1080 to provide access to a network, such as a local area network. The network interface(s) 1080 may include, for example, a wireless network interface having antenna 1085, which may represent one or more antenna(e). The computing system 1000 can include multiple wireless network interfaces such as a combination of Wi-Fi, Bluetooth®, near field communication (NFC), and/or cellular telephony interfaces. The network interface(s) 1080 may also include, for example, a wired network interface to communicate with remote devices via network cable 1087, which may be, for example, an Ethernet cable, a coaxial cable, a fiber optic cable, a serial cable, or a parallel cable.

In one embodiment, the network interface(s) 1080 may provide access to a local area network, for example, by conforming to IEEE 802.11 wireless standards and/or the wireless network interface may provide access to a personal area network, for example, by conforming to Bluetooth standards. Other wireless network interfaces and/or protocols can also be supported. In addition to, or instead of, communication via wireless LAN standards, network interface(s) 1080 may provide wireless communications using, for example, Time Division, Multiple Access (TDMA) protocols, Global System for Mobile Communications (GSM) protocols, Code Division, Multiple Access (CDMA) protocols, Long Term Evolution (LTE) protocols, and/or any other type of wireless communications protocol.

The computing system 1000 can further include one or more energy sources 1005 and one or more energy measurement systems 1045. Energy sources 1005 can include an AC/DC adapter coupled to an external power source, one or more batteries, one or more charge storage devices, a USB charger, or other energy source. Energy measurement systems include at least one voltage or amperage measuring device that can measure energy consumed by the computing system 1000 during a predetermined period of time. Additionally, one or more energy measurement systems can be included that measure, e.g., energy consumed by a display device, cooling subsystem, Wi-Fi subsystem, or other frequently used or high-energy consumption subsystem.

In some embodiments, the hash functions described herein can utilize specialized hardware circuitry (or firmware) of the system (client device or server). For example, the function can be a hardware-accelerated function. In addition, in some embodiments, the system can use a function that is part of a specialized instruction set. For example, the can use an instruction set which may be an extension to an instruction set architecture for particular a type of microprocessors. Accordingly, in an embodiment, the system can provide a hardware-accelerated mechanism for performing cryptographic operations to improve the speed of performing the functions described herein using these instruction sets.

In addition, the hardware-accelerated engines/functions are contemplated to include any implementations in hardware, firmware, or combination thereof, including various configurations which can include hardware/firmware integrated into the SoC as a separate processor, or included as special purpose CPU (or core), or integrated in a coprocessor on the circuit board, or contained on a chip of an extension circuit board, etc.

It should be noted that the term "approximately" or "substantially" may be used herein and may be interpreted as "as nearly as practicable," "within technical limitations," and the like. In addition, the use of the term "or" indicates an inclusive or (e.g. and/or) unless otherwise specified.

In the foregoing description, example embodiments of the disclosure have been described. It will be evident that various modifications can be made thereto without departing from the broader spirit and scope of the disclosure. The specification and drawings are, accordingly, to be regarded in an illustrative sense rather than a restrictive sense. The specifics in the descriptions and examples provided may be used anywhere in one or more embodiments. The various features of the different embodiments or examples may be variously combined with some features included and others excluded to suit a variety of different applications. Examples may include subject matter such as a method, means for performing acts of the method, at least one machine-readable medium including instructions that, when performed by a machine cause the machine to perform acts of the method, or of an apparatus or system according to embodiments and examples described herein. Additionally, various components described herein can be a means for performing the operations or functions described herein.

Embodiments described herein provide techniques to implement multi-level scheduling in data processing systems. In some embodiments, techniques described herein enable a scheduler to schedule tasks for execution at a system-wide level, a thread group level, and a thread level.

One embodiment provides a data processing system comprising one or more processors, a computer-readable memory coupled to the one or more processors, the computer-readable memory to store instructions which, when executed by the one or more processors, configure the one or more processors to receive execution threads for execution on the one or more processors, map the execution threads into a first plurality of buckets based at least in part on a quality of service class of the execution threads, schedule the first plurality of buckets for execution using a first scheduling algorithm, schedule a second plurality thread groups within the first plurality of buckets for execution using a second scheduling algorithm, and schedule a third plurality of threads within the second plurality of thread groups using a third scheduling algorithm.

One embodiment provides for a non-transitory machine-readable medium storing instructions which, when executed by one or more processors of an electronic device, cause the one or more processors to perform operations comprising receiving execution threads for execution on the one or more processors, mapping the execution threads into a first plurality of buckets based at least in part on a quality of service class of the execution threads, scheduling the first plurality of buckets for execution using a first scheduling algorithm, scheduling a second plurality thread groups within the first plurality of buckets for execution using a second scheduling algorithm, and scheduling a third plurality of threads within the second plurality of thread groups using a third scheduling algorithm.

One embodiment provides for a computer-implemented method, comprising receiving execution threads for execution on the one or more processors, mapping the execution threads into a first plurality of buckets based at least in part on a quality of service class of the execution threads, scheduling the first plurality of buckets for execution using a first scheduling algorithm, scheduling a second plurality thread groups within the first plurality of buckets for execution using a second scheduling algorithm, and scheduling a third plurality of threads within the second plurality of thread groups using a third scheduling algorithm.

Other features of the present embodiments will be apparent from the accompanying drawings and from the detailed description above. Accordingly, the true scope of the embodiments will become apparent to the skilled practitioner upon a study of the drawings, specification, and following claims.

What is claimed is:

1. A data processing system comprising:
   one or more processors;
   a computer-readable memory coupled to the one or more processors, the computer-readable memory to store instructions which, when executed by the one or more processors, configure the one or more processors to:
   receive execution threads for execution on the one or more processors;
   map the execution threads into a first plurality of buckets based at least in part on a quality-of-service class of the execution threads;
   map the execution threads into a second plurality of thread groups based on workloads associated with the execution threads;
   schedule the first plurality of buckets for execution using a first scheduling algorithm;

schedule the second plurality of thread groups within the first plurality of buckets for execution using a second scheduling algorithm; and schedule a third plurality of threads within the second plurality of thread groups using a third scheduling algorithm to generate a multi-level schedule for execution of the execution threads.

2. The data processing system as in claim 1, the computer-readable memory further to store instructions which, when executed by the one or more processors, configure the one or more processors to:

determine an execution deadline value for each bucket in the first plurality of buckets based at least in part on a worst case execution latency value for the bucket; and position each bucket the first plurality of buckets in a bucket priority queue according to the execution deadline value for the bucket.

3. The data processing system as in claim 2, the computer-readable memory further to store instructions which, when executed by the one or more processors, configure the one or more processors to:

select for execution a first bucket in the bucket priority queue which has an execution deadline value that is shorter than the execution deadline values associated with other buckets in the bucket priority queue.

4. The data processing system as in claim 3, the computer-readable memory further to store instructions which, when executed by the one or more processors, configure the one or more processors to:

determine a warp window for each bucket in the first plurality of buckets in the bucket priority queue.

5. The data processing system as in claim 4, the computer-readable memory further to store instructions which, when executed by the one or more processors, configure the one or more processors to:

delay execution of the first bucket for a period of time not to exceed the warp window to complete execution of a bucket already being executed.

6. The data processing system as in claim 5, the computer-readable memory further to store instructions which, when executed by the one or more processors, configure the one or more processors to:

assign a plurality of threads associated with a specific workload into a thread group;

determine a thread group priority level for each thread group in the first bucket; and select for execution the thread group having a thread group priority level that is higher than the thread group priority levels associated with other thread groups in the first bucket.

7. The data processing system as in claim 6, the computer-readable memory further to store instructions which, when executed by the one or more processors, configure the one or more processors to:

determine a priority of threads within the thread group selected for execution; and insert threads into a run queue based on the priority; and execute the threads in the run queue.

8. The system according to claim 1, wherein an execution thread comprises instructions for execution on execution resources of the data processing system.

9. A non-transitory machine-readable medium storing instructions which, when executed by one or more processors of an electronic device, cause the one or more processors to perform operations comprising:

receiving execution threads for execution on the one or more processors;

mapping the execution threads into a first plurality of buckets based at least in part on a quality-of-service class of the execution threads;

scheduling the first plurality of buckets for execution using a first scheduling algorithm;

mapping execution threads into a second plurality of thread groups based on workloads associated with the execution threads;

scheduling a second plurality thread groups within the first plurality of buckets for execution using a second scheduling algorithm; and scheduling a third plurality of threads within the second plurality of thread groups using a third scheduling algorithm to generate a multi-level schedule for execution of the execution threads.

10. The non-transitory machine-readable medium as in claim 9, the operations additionally comprising:

determining an execution deadline value for each bucket in the first plurality of buckets based at least in part on a worst case execution latency value for the bucket;

position each bucket the first plurality of buckets in a bucket priority queue according to the execution deadline value for the bucket; and selecting for execution a first bucket in the bucket priority queue which has an execution deadline value that is shorter than the execution deadline values associated with other buckets in the bucket priority queue.

11. The non-transitory machine-readable medium as in claim 10, the operations additionally comprising:

determining a warp window for each bucket in the first plurality of buckets in the bucket priority queue.

12. The non-transitory machine-readable medium as in claim 11, the operations additionally comprising:

delaying execution of the first bucket for a period of time not to exceed the warp window to complete execution of a bucket already being executed.

13. The non-transitory machine-readable medium as in claim 12, the operations additionally comprising:

assigning a plurality of threads associated with a specific workload into a thread group;

determining a thread group priority level for each thread group in the first bucket; and selecting for execution the thread group having a thread group priority level that is higher than the thread group priority levels associated with other thread groups in the first bucket.

14. The non-transitory machine-readable medium as in claim 13, the operations additionally comprising:

determining a priority of threads within the thread group selected for execution; and insert threads into a run queue based on the priority; and execute the threads in the run queue.

15. A computer-implemented method executed on an electronic device including one or more processors, the method comprising:

receiving execution threads for execution on the one or more processors;

mapping the execution threads into a first plurality of buckets based at least in part on a quality-of-service class of the execution threads;

mapping execution threads into a second plurality of thread groups based on workloads associated with the execution threads;

scheduling the first plurality of buckets for execution using a first scheduling algorithm;

scheduling a second plurality thread groups within the first plurality of buckets for execution using a second scheduling algorithm; and scheduling a third plurality of threads within the second plurality of thread groups using a third scheduling algorithm to generate a multi-level schedule for execution of the execution threads.

16. The computer-implemented method as in claim 15, further comprising:

determining an execution deadline value for each bucket in the first plurality of buckets based at least in part on a worst case execution latency value for the bucket; and position each bucket the first plurality of buckets in a bucket priority queue according to the execution deadline value for the bucket.

17. The computer-implemented method as in claim 16, additionally comprising:

selecting for execution a first bucket in the bucket priority queue which has an execution deadline value that is shorter than the execution deadline values associated with other buckets in the bucket priority queue.

18. The computer-implemented method as in claim 17, additionally comprising:

determining a warp window for each bucket in the first plurality of buckets in the bucket priority queue.

19. The computer-implemented method as in claim 18, additionally comprising:

delaying execution of the first bucket for a period of time not to exceed the warp window to complete execution of a bucket already being executed.

20. The computer-implemented method as in claim 19, additionally comprising:

assigning a plurality of threads associated with a specific workload into a thread group;

determining a thread group priority level for each thread group in the first bucket; and selecting for execution the thread group having a thread group priority level that is higher than the thread group priority levels associated with other thread groups in the first bucket.

21. The computer-implemented method as in claim 20, additionally comprising:

determining a priority of threads within the thread group selected for execution; and inserting threads into a run queue based on the priority; and executing the threads in the run queue.

* * * * *